United States Patent [19]
Norfleet

[11] 3,708,880
[45] Jan. 9, 1973

[54] SCARIFIER FOR WALL COVERINGS

[76] Inventor: John H. Norfleet, 15006 Naples Street, Cleveland, Ohio

[22] Filed: Aug. 17, 1970

[21] Appl. No.: 64,490

[52] U.S. Cl. ................... 30/172, 15/93 R, 15/236 R
[51] Int. Cl. .............................................. B26b 3/00
[58] Field of Search.....30/164.9, 166, 170, 276, 321, 30/172; 15/93 R, 236 R; 29/95

[56] References Cited

UNITED STATES PATENTS

| 1,241,577 | 10/1917 | Thompson | 30/170 |
| 1,311,538 | 7/1919 | Tacy | 30/170 |
| 3,365,772 | 1/1968 | Collins | 15/93 R X |

*Primary Examiner*—Othell M. Simpson
*Attorney*—Ely, Golrick & Flynn

[57] ABSTRACT

A tool for scoring a wall covering, such as one or more thicknesses of wallpaper. The tool has circular saw blades which are clamped to the tool body. The clamping arrangement is releasable to permit each saw blade to be adjusted for the desired depth of cut or to permit each saw blade to be turned to present a different portion of its saw-toothed periphery for cutting engagement with the wall covering.

18 Claims, 9 Drawing Figures

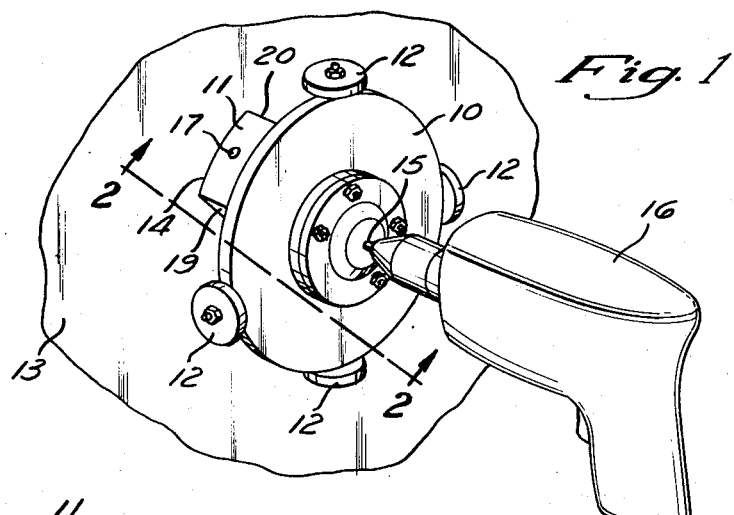
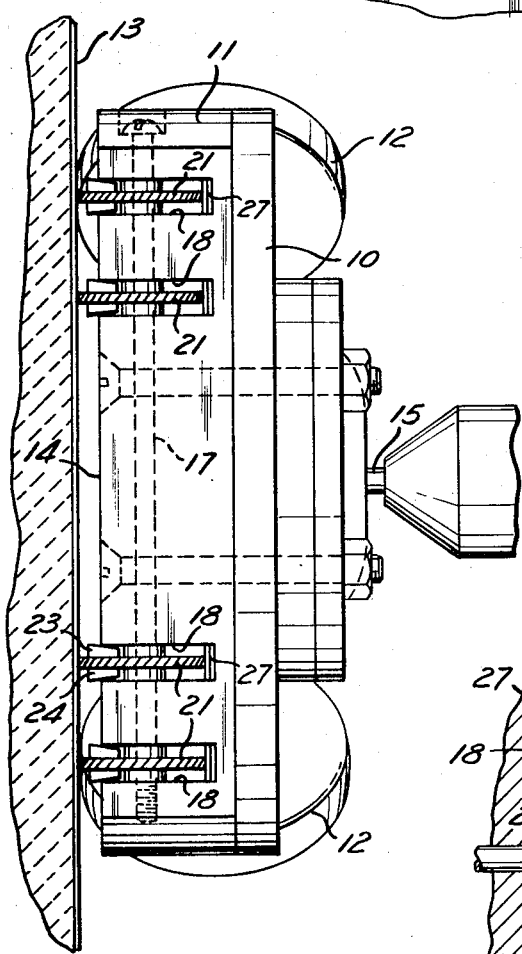
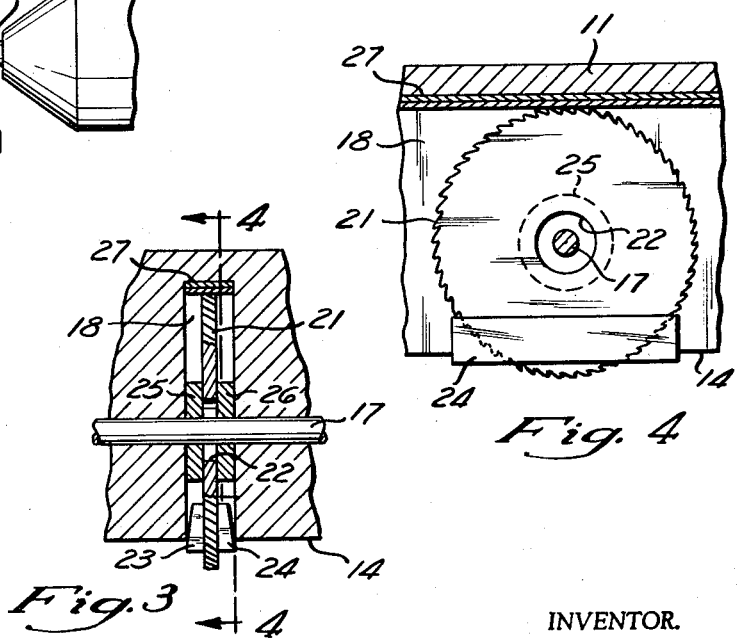

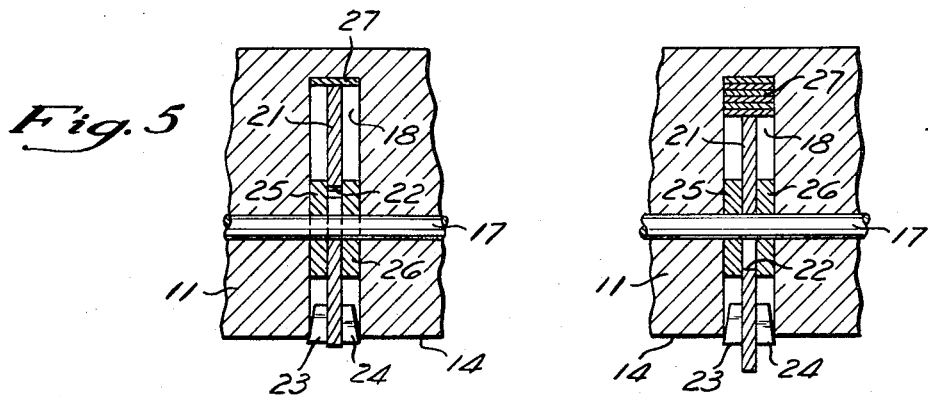
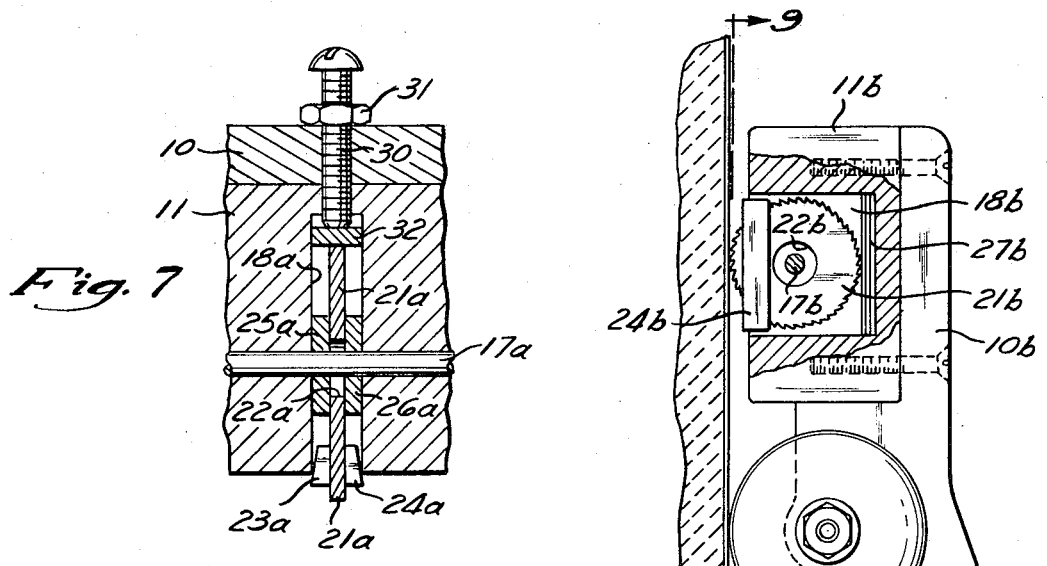
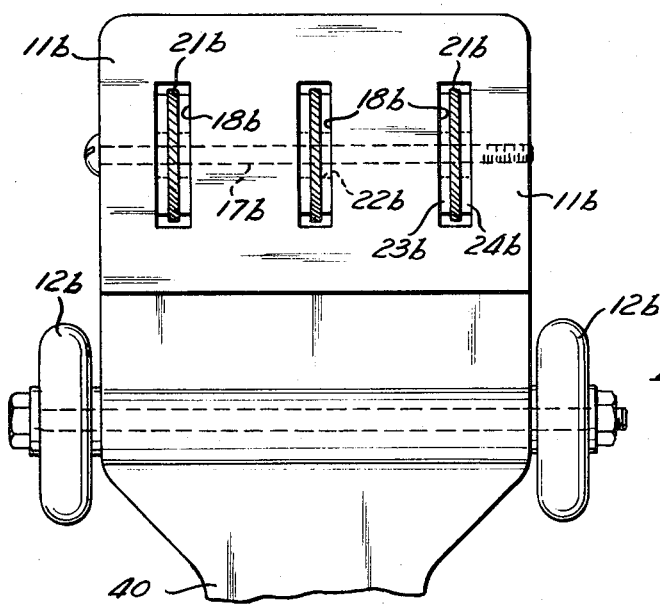

SCARIFIER FOR WALL COVERINGS

This invention relates to a scarifier for use in removing a wall covering, such as one or more layers of wallpaper.

It is a common practice when removing wallpaper or other covering which is adhesively secured to a wall, such as a plaster or plasterboard wall, to first cut the wall covering at various locations on the wall and then apply a fluid, such as water or steam, to the wall covering to loosen it. The cuts made in the wall covering enable the fluid to readily penetrate it and loosen the adhesive so that the wall covering can be more easily removed. While various scarifiers have been proposed heretofore, they have not been entirely satisfactory, particularly where the wall covering to be removed was several layers thick.

The present invention is directed to a novel scarifier which effectively solves these problems.

It is a principal object of this invention to provide a novel and improved scarfiier for use in the removal of wall coverings and the like.

Another object of this invention is to provide such a scarfier having a plurality of cutters which are rigidly clamped to the body of the tool to expose certain cutting edges for cutting engagement with a wall covering, but which may be unclamped and adjusted individually to expose different cutting edges after the previously-used cutting edges have become worn.

Another object of this invention is to provide a novel and improved scarifier having cutters which are adjustably mounted to provide the desired depth of cut, corresponding to the particular thickness of the wall covering encountered.

Another object of this invention is to provide a novel and improved scarifier having adjustable cutters which may be embodied either in a power-driven tool or in a manually-operated tool.

Further objects and advantages of this invention will be apparent from the following detailed description of certain presently-preferred embodiments thereof, which are illustrated in the accompanying drawings.

In the drawings:

FIG. 1 is a perspective view showing a first embodiment of the present scarifier driven by an electric drill and engaging a wall covering;

FIG. 2 is a side elevational view of the FIG. 1 scarifier in use, with certain parts broken away for clarity;

FIG. 3 is an enlarged fragmentary section showing the mounting of one of the cutters on the body of the scarifier;

FIG. 4 is a section taken along the line 4—4 in FIG. 3;

FIGS. 5 and 6 are views similar to FIG. 3 and showing the cutter positioned for minimum and maximum depths of cut, respectively;

FIG. 7 is an enlarged fragmentary section showing a different arrangement for adjusting the cutting depths of each cutter on the scarifier;

FIG. 8 is a side elevational view, with parts broken away for clarity, showing a scarifier in accordance with the present invention which is entirely manually operated; and FIG. 9 is a view of the FIG. 8 tool taken along the line 9—9 in FIG. 8.

Referring first to FIGS. 1 – 4, this embodiment of the invention comprises a rigid cutter-supporting body in the form of a generally circular plate 10 and a rigid block 11 attached to one side of this plate. The plate and block assembly 10,11, which will be referred to as the body, carries four rollers 12 spaced apart around its periphery at 90 degree intervals. When the tool is in use as shown in FIGS. 1 and 2, the body 10,11 extends parallel to the wall and the rollers 12 roll across the wall and the wall covering 13. Preferably the rollers are of Nylon or other suitable self-lubricating material. As best seen in FIG. 2, each roller projects beyond the face 14 of the of the block 11 away from the plate 10, so that this face 14 of the body 10,11 is spaced from the wall covering by the rollers.

The body 10,11 is suitably coupled to a perpendicularly disposed central spindle 15 which is adapted to be received in the chuck of a conventional, hand-held electric drill 16. When the drill is operated the body 10,11 is rotated about the axis of the spindle 15.

As shown in FIGS. 1 and 2, the block 11 extends radially across the plate 10. The block carries a pivot rod 17 (FIG. 2) which extends parallel to the block face 14 which is disposed toward the wall covering 13. The block is formed with a plurality of slotted recesses 18 located at spaced apart intervals along the pivot rod 17. In the particular embodiment shown there are four such recesses, two on each side of the rotational axis of the body 10,11. However, it is to be understood that any desired number of such recesses may be provided. Each of the recesses 18 is open at the face 14 of the block 11, and preferably each is open also at the oppsite side edges 19 and 20 (FIG. 1) of the block.

A cutter, preferably a circular saw blade 21, is positioned in each block recess 18, with a portion of its saw-toothed periphery being disposed outside the recess and projecting beyond the face 14 of the block, as best seen in FIG. 4. One or more teeth on this portion of the saw blade also project slightly beyond the rollers 12 for cutting engagement with the wall covering 13 when the rollers 12 engage the latter.

Preferably, each saw blade has a central opening 22 (FIG. 3) which receives the pivot rod 17 but is substantially larger than the pivot rod to permit the saw blade to be adjusted perpendicular to the rod to provide the desired depth of cut into the wall covering. That is, the saw blades may be adjusted to provide the proper depth of cut for a single thickness of wallpaper or for two, three or more, so that the wall surface behind it may be exposed by the cuts made in the wall covering but will not itself be scored excessively by the saw blades.

In accordance with the present invention, each saw blade is detachably clamped rigidly to the body 10,11 of the tool so as to be prevented from rotating on the pivot rod 17 when the tool is in use. However, after the exposed teeth of any blade have become worn, the user may turn the blade to present a different portion of its saw-toothed periphery for cutting engagement with the wall covering.

To this end, in the embodiment of the invention shown in FIGS. 1 – 4, a pair of tapered wedges 23,24 are provided for releasably clamping each saw blade 21 to the block 11. Each of these wedges is forced between one face of the saw blade and the adjacent face of the recess at the bottom face 14 on block 11. When in place, as shown, the wedges project slightly beyond the block face 14 but not as far as the exposed portion of the saw-toothed periphery of the blade 21 which is to engage and cut the wall covering.

When the user notices that the exposed portion of the saw blade has become worn, he may remove the wedges 23,24 by the use of a screw driver or other suitable tool and then turn the saw blade to expose a different portion of its saw-toothed periphery for cutting engagement with the wall covering, after which he may reinsert the wedges to lock the saw blade in place in the new position.

A pair of flat annular washers 25,26 on the rod 17 are engaged between the respective faces of the saw blade 21 and the adjacent sides of the recess 18 to locate the saw blade axially along the rod without, however, preventing it from being turned by the user after he has removed the wedges.

Preferably, one or more shims 27 are seated at the inner end of each recess 18 for engagement by the periphery of the saw blade diametrically opposite its exposed portion. These shims limit the adjustment of the saw blade into the recess 18 and therefore the total thickness of the shims determines how far out of the recess the saw blade projects. Shims may be inserted or removed conveniently by being slid along the bottom of the respective recess 18 from either side edge 19 or 20 of the block 11.

For example, FIG. 5 shows the position of the saw blade when there is only a single shim 27 in the bottom of the recess. This establishes a minimum projection of the saw blade for use on a single thickness of wallpaper.

Conversely, if the wallpaper is several layers thick a maximum cutting depth of the saw blades may be established by seating several shims 27 in the bottom of each recess 18, as shown in FIG. 6.

When the tool is in use, held with its rollers 12 against the wall covering 13 and with the tool body 10,11 rotating parallel to the wall, as shown in FIGS. 1 and 2, the saw blades are rigidly coupled to the rotating body 10,11 so as to move in unison with it. The portions of these saw blades which project beyond the rollers 12 cut into the wall covering 13 as the tool body 10,11 rotates. It has been found that this rigid coupling of the saw blades to the tool body produces a very effective cutting action on the wall covering, particularly where it is several layers thick.

FIG. 7 shows an alternative embodiment having an adjusting screw 30 and a lock 31 for adjusting the depth of cut provided by the saw blade 21a. The adjusting screw is screw-threaded into the plate 10 and block 11 behind the inner end of the recess 18a. A plate 32 is engaged between the inner end of the adjusting screw and the portion of the saw blade's periphery at the inner end of the recess 18. The lock nut 31 is engageable with the outer face of plate 10 to lock the screw 30 in any position to which it has been adjusted.

In other respects the saw blade clamping assembly of FIG. 7 is basically similar to that of FIGS. 1 – 6. In FIG. 7, the same reference numerals, with an *a* suffix added, are used for the parts which correspond to those in FIGS. 1 – 6.

FIGS. 8 and 9 show another embodiment of the present tool which is intended to be powered manually, instead of by an electric drill. Corresponding elements of this embodiment are given the same reference numerals as those in FIGS. 1 – 6, but with a *b* suffix added.

In FIGS. 8 and 9 the plate 10b is attached integrally to a handle 40 which the user grasps manually as he moves the tool across the wall covering 13b. A pair of rollers 12b are rotatably mounted on the body of the tool, being located on opposite sides of the tool below the block 11b which supports the saw blades 21b. The saw blades themselves are mounted in the body of the tool in the same manner as described in detail with reference to FIGS. 1 – 6, so that they move in unison with the tool body and without turning on the pivot rod 17b when the tool is in use. These saw blades may be adjusted in the manner and for the purpose already described.

While presently-preferred embodiments of this invention have been described in detail with reference to the accompanying drawings, it is to be understood that various modifications and omissions which depart from the specific structural arrangements disclosed may be adopted without departing from the scope of this invention.

I claim:

1. A scarifier for use in removing a wall covering or the like comprising:
   a body
   a plurality of cutters supported from said body and each having elongated periphery presenting one or more cutting edges along it length, each having only a portion of the total length of its elongated periphery disposed for cutting engagement with the wall covering when said body is moved thereacross;
   and releasable clamping means securing said cutters against movement relative to said body;
   each of said cutters, when said clamping means is released, being selectively adjustable relative to said body to change the portion of the total length of its periphery which is disposed for cutting engagement with the wall covering.

2. A scarifier according to claim 1, wherein each cutter has a series of projecting teeth along its periphery for cutting engagement with the wall covering.

3. A scarifier according to claim 1, wherein each of said cutters is a circular saw blade having a series of saw teeth on its periphery and each is positioned with only a portion of its saw-toothed periphery projecting away from said body for cutting engagement with the wall covering, and each cutter is turnable, when said clamping means is released, to change the portion of its saw-toothed periphery which is positioned for cutting engagement with the wall covering.

4. A scarifier according to claim 1 and further comprising rollers supported from said body for rolling engagement with the wall covering while the cutters are in cutting engagement with the wall covering.

5. A scarifier according to claim 1, and further comprising a shank on the opposite side of said body from the cutters and adapted to be attached to a power tool for rotating the scarifier.

6. A scarifier according to claim 1, and further comprising a handle on the opposite side of said body from the cutters and shaped and dimensioned to be manually grasped.

7. A scarifier according to claim 1, wherein said body has a plurality of recesses therein which are open at one side of the body, and each of said cutters is received in a respective recess in the body with a portion of its periphery projecting beyond said side of the body.

8. A scarifier according to claim 7, wherein said clamping means comprises one or more wedges tightly securing each cutter in the respective body recess and removable from said recess to permit the cutter to be turned.

9. A scarifier according to claim 7, wherein each of said cutters is a circular saw blade, and further comprising a rod extending across each recess in the body, and wherein each of said saw blades has an opening which receives the rod and is substantially larger than the rod to permit adjustment of the saw blade into or out of the recess to change the extent to which its toothed periphery projects beyond said side of the body.

10. A scarifier according to claim 9, wherein said clamping means comprises one or more wedges tightly securing each saw blade in the respective body recess and removable from said recess to permit the saw blade to be turned.

11. A scarifier according to claim 9, and further comprising one or more shims at the inner end of each recess engaging the periphery of the saw blade thereat.

12. A scarifier for use in removing a wall covering or the like comprising:
   a body;
   a plurality of cutters supported from said body and each projecting from said body each of said cutters having one or more cutting edges disposed beyond said body for cutting engagement with the wall covering when said body is moved thereacross;
   and releasable clamping means securing said cutters to said body;
   each of said cutters, when said clamping means is released, being selectively adjustable relative to said body to change the depth of its cut in the wall covering.

13. A scarifier according to claim 12, wherein each of said cutters is a circular saw blade having a series of saw teeth on its periphery which provides said cutting edges and each is positioned with only a portion of its saw-toothed periphery disposed beyond said body for cutting engagement with the wall covering, and each cutter is rotatable, when said clamping means is released, to change the portion of its saw-toothed periphery which is disposed beyond said body for cutting engagement with the wall covering.

14. A scarifier according to claim 13, wherein each of said cutters is adjustable toward or away from said body, when said clamping means is released, to change the depth of cut which it provides.

15. A scarifier according to claim 12, wherein said body has a plurality of recesses which are open at one side of the body, and each of said cutters is received in a respective recess with a portion of its periphery projecting beyond said side of the body.

16. A scarifier according to claim 13, wherein said clamping means comprises one or more wedges tightly securing each cutter in the respective recess and removable from said recess to permit the adjustment of the cutter into or out of the recess.

17. A scarifier according to claim 15, wherein each of said cutters is a circular saw blade having a series of saw teeth on its periphery which provides said cutting edges and each is positioned with only a portion of its saw-toothed periphery disposed beyond said body for cutting engagement with the wall covering, and each cutter is rotatable, when said clamping means is released, to change the portion of its saw-toothed periphery which is disposed beyond said body for cutting engagement with the wall covering.

18. A scarifier according to claim 17, and further comprising a rod extending across each recess in the body, and wherein each of said saw blades has an opening which receives the rod and is substantially larger than the rod to permit adjustment of the saw blade into or out of the recess to change the depth of its cut.

* * * * *